United States Patent [19]

Colgate

[11] Patent Number: 4,884,404
[45] Date of Patent: Dec. 5, 1989

[54] MASTER CYLINDER ASSEMBLY

[75] Inventor: Brian M. Colgate, Gloucestershire, Great Britain

[73] Assignee: Lucas Industries Public Limited Company, Birmingham, United Kingdom

[21] Appl. No.: 186,141

[22] Filed: Apr. 26, 1988

[30] Foreign Application Priority Data

Apr. 30, 1987 [GB] United Kingdom ............... 8710273

[51] Int. Cl.⁴ .............................................. F15B 7/00
[52] U.S. Cl. ........................................ 60/581; 60/591
[58] Field of Search ................ 60/546, 581, 582, 589, 60/591, 533, 562; 91/514, 515, 517, 518

[56] References Cited

U.S. PATENT DOCUMENTS

| | | | |
|---|---|---|---|
| 4,006,593 | 2/1977 | Edwards | 60/581 |
| 4,178,757 | 12/1979 | Ketterling et al. | 60/581 X |
| 4,231,224 | 11/1980 | Edwards et al. | 60/581 |
| 4,463,562 | 8/1984 | Taft | 60/581 X |
| 4,488,405 | 12/1984 | Price et al. | 60/589 X |
| 4,534,172 | 8/1985 | Price et al. | 60/581 X |
| 4,553,395 | 11/1985 | Price et al. | 60/581 X |
| 4,557,110 | 12/1985 | Price | 60/581 |
| 4,732,002 | 3/1988 | Farr | 60/562 |

Primary Examiner—Edward K. Look
Attorney, Agent, or Firm—Fleit, Jacobson, Cohn, Price, Holman & Stern

[57] ABSTRACT

A master cylinder assembly wherein pressure cylinders are formed in a body and interconnected by a transfer passage through which fluid flow is controlled by valve elements. The valve elements are operated in response to actuating pressure in the cylinders and are opened by this pressure to interconnect the cylinders when the latter are pressurized simultaneously. When only one cylinder is pressurized, the valve elements associated with other cylinders remain closed to prevent fluid flow through the transfer passage. The valve elements have stems which control expulsion of fluid from the cylinders through outlets.

20 Claims, 1 Drawing Sheet

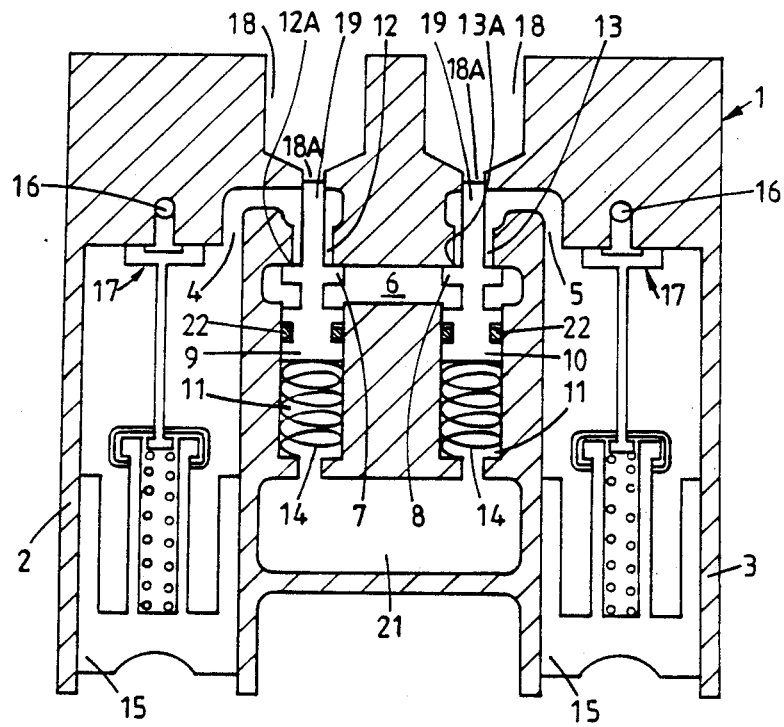

MASTER CYLINDER ASSEMBLY

BACKGROUND OF THE INVENTION

This invention relates to a master cylinder assembly, primarily for a vehicle hydraulic braking system, and of the general type having a plurality of pressure cylinders between which extends a transfer passage controlled by valve means to permit communication between respective pressure chambers of the cylinders when the cylinders are actuated simultaneously and to prevent such communication when one of the cylinders is operated individually. Such an assembly is of particular use in an agricultural tractor, for example, in which normal straight-line braking is accomplished by the simultaneous actuation of a pair of cylinders and steering assistance can be provided by actuating one or the other of the cylinders individually.

Master cylinder assemblies of the aforesaid general type are known in which the valve means are actuated mechanically, often by the pressure pistons engaging valve elements during part of the piston travel. Although satisfactory in use, such arrangements are subject to the inevitable wear suffered by the mechanical components and often require special shaping of the pistons to achieve the desired operational function which adds to manufacturing costs. One proposal which avoids the use of mechanically operated valves employs a hydraulically operated compensating piston subject on opposed faces respectively to the pressures of a pair of cylinders. The compensation available by this means depends on the available movement of the compensating piston, which can be insufficient in some practical arrangements. The provision of such a compensating piston is also relatively expensive.

BRIEF SUMMARY OF THE INVENTION

An object of the invention is to provide an improved master cylinder assembly of the aforesaid type in which hydraulic control of fluid flow through a transfer passage is provided in a simple and convenient manner.

According to the present invention, a master cylinder assembly comprises a plurality of pressure cylinders, a transfer passage extending between the cylinders, valve members urged towards first positions in which they interrupt communication between said passage and the cylinders respectively but being subject to actuating pressure arising in the cylinders, whereby, when both cylinders are pressurized simultaneously, the valve members are both displaced by the actuating pressure to second positions in which they place the cylinders in communication with each other via the transfer passage, but actuation of only one cylinder displaces one of the valves, leaving the other in a position in which the other cylinder is not in communication with the passage.

Pressure fluid outlets of the cylinders are preferably closed by the valve members when the latter are in their first positions, and movement of each valve member towards its second position opens the associated outlet to permit expulsion of fluid under pressure therethrough from the associated cylinder.

BRIEF DESCRIPTION OF THE DRAWING

The invention will now be described, by way of example, with reference to the single accompanying DRAWING which is a diagrammatic representation of one form of the master cylinder assembly of the invention.

DETAILED DESCRIPTION

The master cylinder assembly illustrated in the drawing includes an integral body 1 containing a pair of cylinders 2, 3, the forward ends of which are connected via passages 4, 5 to a transfer passage 6. Fluid flow through the passage 6 is controlled by valve members 7, 8 the lower end portions of which form plungers 9, 10 slidable in bores 11 in order to support the valve members for operation. The passages 4, 5 lead into the transfer passage 6 by way of ports 12, 13 surrounded respectively by seats 12A, 13A and the valve members are urged towards their closed positions against these seats as shown, by springs 14 housed in the bores 11 beneath the plungers 9, 10.

Respective pistons 15 in the cylinders 2, 3 would normally be connected together for simultaneous actuation so as respectively to apply brakes on the rear wheels of a tractor, for example, for normal retardation of the tractor. The cylinders 2, 3 are provided with respective recuperation ports 16 controlled by conventional center valve assemblies 17 actuated by the pistons 15. The body 1 is provided with a pair of pressure outlet connections 18 for connection respectively to the wheel brakes and these are closed, for the inoperative condition of the assembly as shown, by stems 19 projecting respectively from the valve members 7, 8 and extending into narrowed parts 18A of the outlets.

Pressure built up in the cylinders 2, 3 upon closure of the recuperation ports 16 by the center valves 17 is applied to the valve members 7, 8 via the passages 4, 5 and the ports 12, 13, causing the valve members to move away from seats 12A, 13A surrounding the ports 12, 13 and thereby establish communication between the cylinders and the compensating passage 6 in order to equalize the pressures in the two cylinder in the usual way. The stems 19 on the valve members 12, 13 are simultaneously moved to open the fluid outlets 18 by the aforesaid movement of the valve members. The outlets are re-closed upon reverse movement of the valve members. When only one of the cylinders is actuated, so as to apply a brake on one wheel only for steering purposes, the pressure built up in the other cylinder opens the corresponding valve 7, 8 to place that cylinder in communication with the corresponding outlet 18 and permit actuation of the associated brake. The force of the respective spring 14 acts in the reverse direction on the other valve 7, 8 thereby maintaining that valve firmly closed to ensure that no communication occurs via the passage 6 between the two cylinders. The corresponding brake outlet 18 also remains blocked by the engaged valve stem 19.

In this embodiment, the bores 11 in which the plungers 9, 10 slide are in communication with a reservoir 21 formed in the body 1 and the plungers are provided with seals 22 acting to prevent communication between the compensating passage 6 and reservoir 21. These seals are able to work in a fluid environment so that they slide against a wet surface and thereby minimize wear and the possibility of jamming. The bores 11 also act to provide venting for the valve members 7, 8 via the reservoir 21 to ensure that pressure build-up behind plungers 9, 10 of the valve members does not occur. Venting could, however, be provided in an alternative manner, such as by venting the bores 11 directly to atmosphere via appropriate passages.

It will be understood that the cylinders 2, 3, although illustrated as part of a unitary body, could alternatively be separate items interconnected by an external transfer passage.

I claim:

1. A master cylinder assembly comprising;
   a plurality of pressure cylinders;
   a transfer passage extending between said cylinders;
   a plurality of valve members operable in response to actuating pressure produced in the cylinders for controlling fluid flow through said transfer passage and being urged towards first positions for interrupting communication between said transfer passage and said cylinders, respectively, so that when said cylinders are pressurized simultaneously said valve members are simultaneously displaced by said actuating pressure to second positions for placing said cylinders in communication with each other via said transfer passage, and when only one cylinder is pressurized only one of said valve members is displaced for placing only said one cylinder in communication with said transfer passage;
   pressure fluid outlets for said cylinders; and
   each valve member being associated with a respective pressure fluid outlet for closing said pressure fluid outlets when said valve members are in said first positions, and for opening a respective associated pressure fluid outlet when each valve member moves towards said second position to permit expulsion of fluid under pressure therethrough from an associated cylinder.

2. A master cylinder assembly as claimed in claim 1 and further comprising:
   a projecting stem on each valve member for closing a respective one of said pressure fluid outlets when each valve member is in said first position thereof.

3. A master cylinder assembly as claimed in claim 2 wherein:
   a unitary body is provided; and
   said pressure cylinders, transfer passage and pressure fluid outlets are in said unitary body.

4. A master cylinder assembly as claimed in claim 3 wherein:
   said plurality of pressure cylinders comprises two pressure cylinders; and
   said valve members comprise two valve members.

5. A master cylinder assembly as claimed in claim 3 wherein:
   each cylinder has a pressurizing forward end;
   said transfer passage comprises in part a cylinder outlet for each cylinder extending in said unitary body from said forward end substantially parallel to the axial direction of the respective cylinder;
   each pressure fluid outlet comprises a narrowed part communicating with said transfer passage between a respective cylinder outlet and one of said valve members; and
   each projecting stem extends in a part of said transfer passage between said respective cylinder outlet and said one of said valve members and is slidably receivable in a respective one of said narrowed parts for closing the respective pressure fluid outlet.

6. A master cylinder assembly as claimed in claim 2 wherein:
   said plurality of pressure cylinders comprises two pressure cylinders; and
   said valve members comprise two valve members.

7. A master cylinder assembly as claimed in claim 1 and further comprising:
   a plurality of bores;
   a plunger slidably movable in each bore; and
   each valve member being connected to a respective one of said plungers for movement therewith, said plungers providing translational support for an associated valve member.

8. A master cylinder assembly as claimed in claim 7 and further comprising:
   a reservoir communicating with said bores at the portion of each bore on the side of said plunger opposite to the side connected to said valve member for venting said bores.

9. A master cylinder assembly as claimed in claim 8 wherein:
   a unitary body is provided; and
   said pressure cylinders, transfer passage, bores, and reservoir are provided in said unitary body.

10. A master cylinder assembly as claimed in claim 7 and further comprising:
    spring means for resiliently urging said valve members towards said first positions.

11. A master cylinder assembly as claimed in claim 10 wherein:
    said spring means comprises coil spring means in each bore at the side of said plunger opposite to said valve member.

12. A master cylinder assembly as claimed in claim 10 wherein:
    said plurality of pressure cylinders comprises two pressure cylinders; and
    said valve member comprise two valve members.

13. A master cylinder assembly as claimed in claim 7 wherein:
    a unitary body is provided; and
    said pressure cylinders, transfer passage and bores are provided in said unitary body.

14. A master cylinder assembly as claimed in claim 7 and further comprising:
    a projecting stem on each valve member for closing a respective one of said pressure fluid outlets when each valve member is in said first position thereof.

15. A master cylinder assembly as claimed in claim 14 and further comprising:
    spring means for resiliently urging said valve members towards said first positions.

16. A master cylinder assembly as claimed in claim 7 wherein:
    said plurality of pressure cylinders comprises two pressure cylinders; and
    said valve members comprise two valve members.

17. A master cylinder assembly as claimed in claim 1 wherein:
    a unitary body is provided; and
    said pressure cylinders and transfer passage are in said unitary body.

18. A master cylinder assembly as claimed in claim 17 wherein:
    said plurality of pressure cylinders comprises two pressure cylinders; and
    said valve members comprise two valve members.

19. A master cylinder assembly as claimed in claim 1 wherein:
    said plurality of pressure cylinders comprises two pressure cylinders; and
    said valve members comprises two valve members.

20. A master cylinder assembly as claimed in claim 1 wherein:
    each cylinder has a pressurizing forward end; and
    said transfer passage comprises in part a cylinder outlet for each cylinder extending from said forward end substantially parallel to the axial direction of the respective cylinder.

* * * * *